March 3, 1936.  C. E. FREDERICKSON  2,032,657
MOTOR VEHICLE
Filed Aug. 28, 1934  2 Sheets-Sheet 2
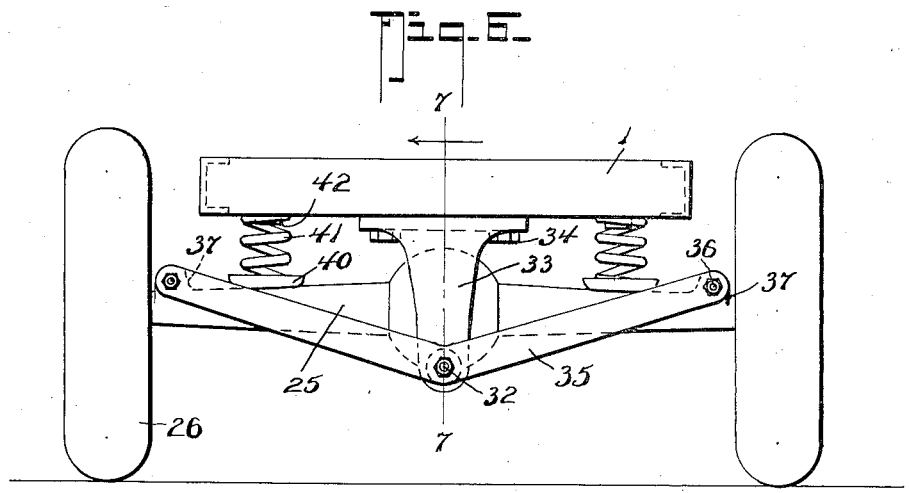
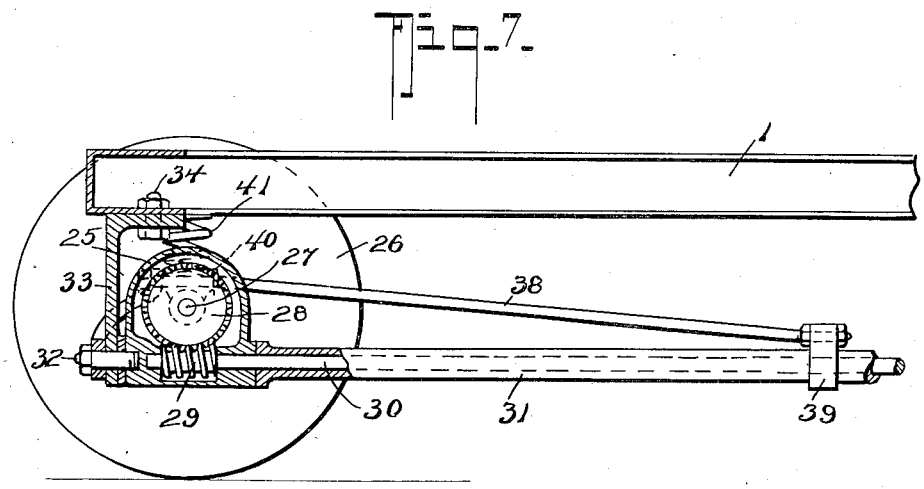
Inventor
Clayton E. Frederickson
By Albert E. Dieterich
Attorney Patented Mar. 3, 1936

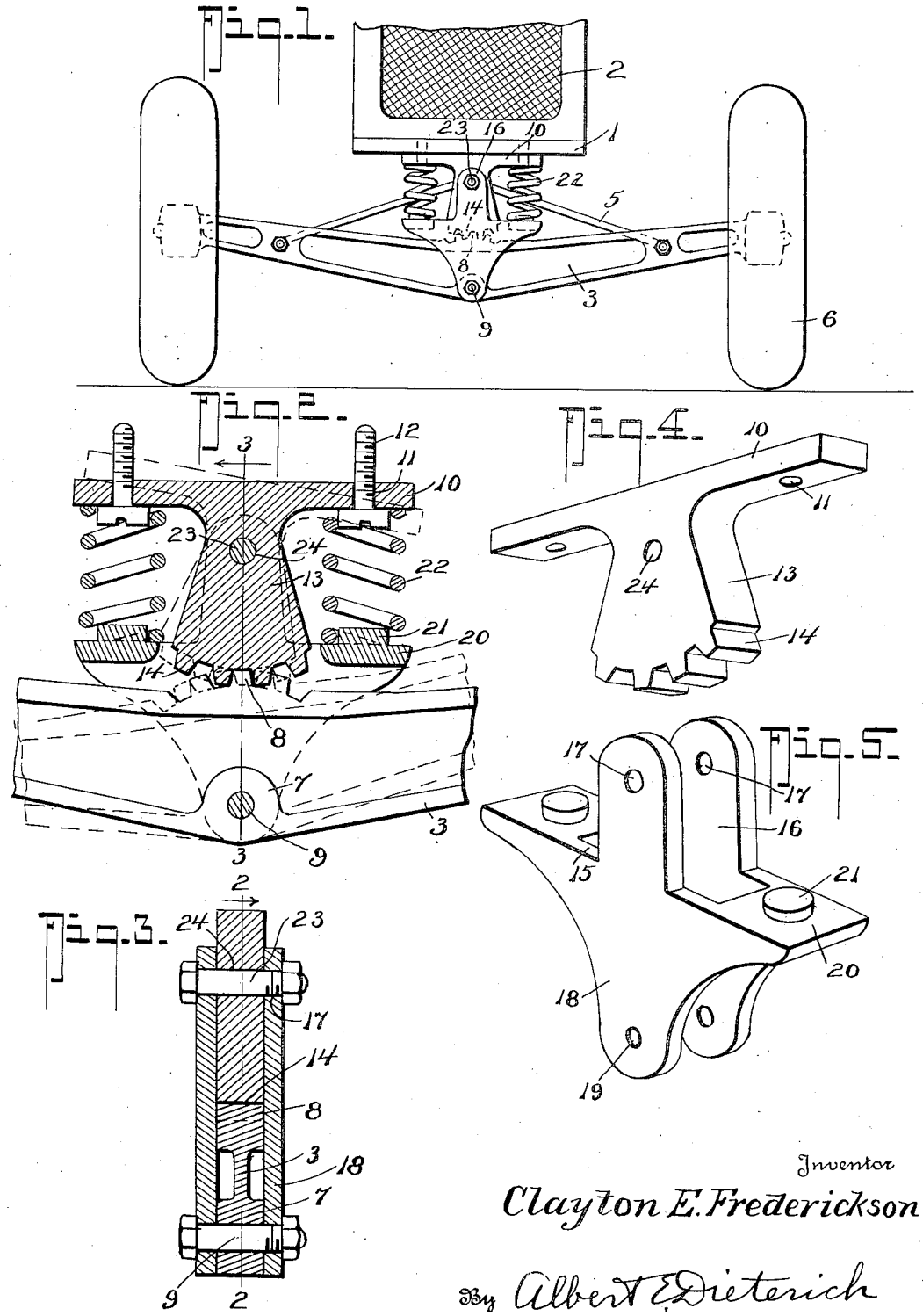

2,032,657

UNITED STATES PATENT OFFICE 2,032,657

MOTOR VEHICLE

Clayton E. Frederickson, Chicago, Ill.

Application August 28, 1934, Serial No. 741,851

9 Claims. (Cl. 280—111)

My invention relates to motor vehicles in general and it more particularly has reference to means for carrying the weight of the vehicle upon the front and rear axles.

It is now the common practice in motor vehicles to provide a set of springs connected to the chassis frame and to the front axle and the rear axle housing. My present invention has for its object to eliminate such springs and to use so-called air wheels (i. e., balloon type tires of low air pressure, namely eight to ten pounds, such as are used on the landing gear of airplanes, for example) to carry the weight of the vehicle.

A further object is to provide adapters, front and rear, which will enable the converting over of the ordinary car using springs for shock absorbing purposes to one using air wheels.

Further, it is an object to provide means for connecting the front axle structure to the chassis frame in such a manner so that as the front wheels pass over road obstructions the body will be kept substantially level, its position at all times being governed by that of the rear axle.

Further, it is an object to provide an automobile in which the front axle and the rear axle housing are fastened to the chassis frame unsprung, yet are permitted to rock, but always in the line of the propeller shaft so that no universal joints are needed—only a flexible coupling back of the transmission.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the drawings in which:—

Figure 1 is a front elevation of a portion of an automobile embodying my invention.

Figure 2 is an enlarged detail section on the line 2—2 of Figure 3.

Figure 3 is a cross section on the line 3—3 of Figure 2.

Figure 4 is a perspective view of the gear-segment bracket which is securable to the chassis frame.

Figure 5 is a perspective view of the casting which links the axle to the bracket shown in Figure 4.

Figure 6 is a rear elevation of a portion of the automobile embodying my invention.

Figure 7 is a longitudinal section approximately on the line 7—7 of Figure 6.

In the drawings, in which like numerals of reference designate like parts in all of the figures, 1 represents the chassis frame and 2 the radiator, which parts may be of any of the ordinary constructions. The front axle which I prefer to employ with my present invention is of the type described in my Patent No. 1,599,614, issued September 14, 1926, the front axle being braced by means of the usual wish-bone radius rods 5 now commonly employed in Ford automobiles.

The front air wheels are indicated by 6, and 4 designates the split socket corresponding to that numbered 2 in my Patent No. 1,599,614 aforesaid. As the means for mounting the wheel on the axle may be the same as that shown in my aforesaid patent further description thereof is thought to be unnecessary.

The axle 3 at its central portion is provided with a bearing lug 7 to receive the pivot bolt 9 that passes through the axle and through the arms 18 of the link-casting 15.

The axle 3 at its center portion is also provided with a gear segment 8 which meshes with the teeth 14 of a gear segment 13 constituting a part of the gear-segment bracket 10 which is secured to the chassis frame 1 by bolts 12 which pass through holes 11 in the bracket and frame.

The link-casting 15 has a pair of upwardly extending arms 16 to straddle the gear segment 13, the arms 16 being provided with pivot bolt holes 17 for the passage of the pivot bolt 23 that passes through the hole 24 in the gear segment 13.

The downwardly extending arms 18 of the link-casting 15 are also provided with pivot bolt holes 19 through which the pivot bolt 9 passes.

The casting 15 is provided with lateral extensions 20 which have lugs 21 to hold the balancing springs 22 in place, the springs also being held in place by the round heads of the bolts 11 (see Figure 2).

25 designates the rear axle housing and 26 designates the rear wheels. The rear axle housing carries the rear axle 27 and the differential mechanism which includes the driving gear 28. In the drawings I have shown the rear axle of the worm-gear type, but it is obvious that the ordinary bevel-gear type axle may be used if desired.

29 is the driving worm on the driving shaft 30 which meshes with the worm gear 28, the driving shaft being enclosed in a housing 31.

In line with the shaft 30 and preferably to the rear of the rear axle housing is a stud 32 on which is pivoted a bracket 33 that is secured by bolts 34 to the chassis frame, there being an inverted truss 35 also mounted on the stud 32 and having its ends secured at 36 to lugs 37 on the rear axle housing adjacent the wheels. Radius rods 38 also run from these lugs to a bracket 39 on the driving shaft housing 31.

The rear axle housing 25 carries spring cups 40 in which the bearing springs 41 rest, they being held in place by lugs 42 on the chassis frame.

So far as described it will be noted that the connections between the axles and the chassis frame are unsprung connections; that is to say, no springs are used to support the weight of the chassis frame and superstructure on the axles or axle housing. If a front wheel 6 of the vehicle, for instance, rides over an obstruction which tends to raise a wheel (say the left front wheel in Figure 1) the front axle 3 will be rocked on the right front wheel of the vehicle (see Figure 1) as a pivot. The raising of the front left wheel of the vehicle in riding over the obstruction causes a relatively reverse movement in the body 1 which equalizes the rise of the wheel going over the obstruction and the body of the vehicle is maintained approximately level. Since the pivotal connection between the chassis frame and the front axle is not a fixedly located one, as is the connection between the frame and the rear axle, a tilting of the rear axle, as when a rear wheel rides over an obstruction, does not impart a tilting motion to the front axle via the frame, nor does a twist in the frame occur since any tendency of the frame to tilt, that may occur as a rear wheel rises, is compensated for in the rolling contact between gear segments 8 and 14; as the rear balancing spring adjacent the high wheel is compressed by the rise of the wheel, the tendency to tilt the frame laterally is resisted by the diagonally opposite front spring, thus keeping the frame approximately horizontal while travelling over ordinary bumps and road inequalities. For example, assume the rear right wheel is rising over a hump in the road; this would raise the pivot 32 and tend to tilt frame 1 to the left; as the frame 1 starts to tilt, the spring 22 on the left side of the vehicle is put under compression and resists the tilting movement. Due to the gear segments 8—14, the movement tending to compress the front spring is greater than that tending to compress the rear spring and hence greater compression stress is put on the front spring than on the rear, which effects an approximate balance (assuming, of course, the front and rear springs are properly designed with relation to each other, as they should be) and hence the tilt of the frame is so retarded that the frame remains almost horizontal while the wheels go over obstructions. In this way each wheel of the vehicle is free to ride over an obstruction without substantially tilting the body of the vehicle.

As air wheels are employed in lieu of the ordinary tired wheels they are relied upon solely for the absorption of road shocks. These air wheels, as before intimated, are wheels with large size balloon type tires built to carry the required weight under air pressures of from eight to ten pounds.

By the use of my invention a very easy riding vehicle is obtained and the transmission of road shocks is practically completely absorbed by the tires and are consequently not transmitted to the chassis of the vehicle.

From the foregoing description, taken in connection with the accompanying drawings, it is thought that the construction, operation and advantages of my invention will be clear to those skilled in the art to which it appertains.

What I claim is:

1. In an automobile, a chassis frame, a front axle, a rear axle structure including a housing, air wheels mounted on the front and rear axles, rigid means pivotally connecting said front axle and said rear axle structure to the chassis frame on longitudinal axes, balancing springs tending to keep the chassis frame level, the front pivotally connecting means including gear segments carried by the front axle and by the adjacent part of the chassis frame.

2. In an automobile, a chassis frame, a front axle, air wheels carried by said axle, a gear-segment bracket carried by the chassis and having gear teeth, a gear segment on said axle meshing with said first mentioned gear segment's teeth, a link-body pivoted to said axle and to said gear-segment bracket, and balancing springs between said bracket and said link-body.

3. In an automobile, a chassis frame, a front axle, air wheels carried by said axle, a gear-segment bracket carried by the chassis and having gear teeth, a gear segment on said axle meshing with said first mentioned gear segment's teeth, a link-body pivoted to said axle and to said gear-segment bracket, and balancing springs between said bracket and said link-body, said link-body having arms embracing said axle and said bracket.

4. In combination with a chassis frame, a rear axle structure, a bracket carried by said frame and pivotally connected to said rear axle structure on a longitudinal axis and leveling springs between said axle and said chassis frame, one at each side of the vertical plane containing the pivotal connection, a front axle, a bracket secured to said chassis frame over the front axle, a link-casting pivoted to said last named bracket and to said front axle and having lateral extensions, said last named bracket having lateral extensions, leveling springs between said lateral extensions of said bracket and said casting, radius rods between the front axle and the chassis frame, a gear segment on said front axle and a gear segment on said last named bracket, said gear segments meshing with one another.

5. In an automobile, a chassis frame, a front axle connected with the chassis frame, a rear axle structure, rigid means pivotally mounting said rear axle structure to said chassis frame on a longitudinal axis in the central vertical longitudinal plane of the vehicle whereby the weight of the chassis frame will be directly supported by said front axle and said rear axle structure, and means continuously tending to keep said chassis frame level regardless of the tilt of the axles within predetermined limits.

6. In an automobile, a chassis frame, a front axle connected with the chassis frame, a rear axle structure, rigid means pivotally mounting said rear axle structure to said chassis frame on a longitudinal axis in the central vertical longitudinal plane of the vehicle whereby the weight of the chassis frame will be directly supported by said front axle and said rear axle structure, and means continuously tending to keep said chassis frame level regardless of the tilt of the axles within predetermined limits, said last named means including balancing springs and a compensating connection between said chassis frame and said front axle.

7. In an automobile, a chassis frame, a front axle connected with the chassis frame, a rear axle structure, rigid means pivotally mounting said rear axle structure to said chassis frame on a longitudinal axis in the central vertical longitudinal plane of the vehicle whereby the weight of the chassis frame will be directly supported by said front axle and said rear axle structure, means continuously tending to keep said chassis frame level regardless of the tilt of the axles within predetermined limits, said last named means including a gear segment on the front axle and a gear segment on the chassis frame, said segments having meshing teeth, a link-body pivotally connected with the chassis and connected with the axle above and below the meshing teeth respectively, and balancing springs at either side of the vertical plane in which the axes of the pivotal connections lie.

8. In an automobile, a chassis frame, a front axle connected with the chassis frame, a rear axle structure, rigid means pivotally mounting said rear axle structure to said chassis frame on a longitudinal axis in the central vertical longitudinal plane of the vehicle whereby the weight of the chassis frame will be directly supported by said front axle and said rear axle structure, means continuously tending to keep said chassis frame level regardless of the tilt of the axles within predetermined limits, said last named means including a gear segment on the front axle and a gear segment on the chassis frame, said segments having meshing teeth, a link-body pivotally connected with the chassis and connected with the axle above and below the meshing teeth respectively, balancing springs at either side of the vertical plane in which the axes of the pivotal connections lie and an inverted truss connected to the pivot connection and to the axle.

9. In an automobile, a chassis frame, a front axle, a rear axle structure including a housing, wheels mounted on the front and rear axles, means pivotally connecting said frame to said rear axle structure at a point midway the rear wheels and on a fixedly located longitudinal pivot axis, means pivotally connecting said frame to said front axle on a longitudinal axis by a limited laterally shiftable pivot, in virtue of which upon the rising of a rear wheel over an obstruction the front pivot point of chassis frame to axle will shift proportionately toward the opposite side of the vehicle, and balancing springs front and rear tending to keep the chassis frame level.

CLAYTON E. FREDERICKSON.